US012654787B2

(12) United States Patent
Nordbø et al.

(10) Patent No.: US 12,654,787 B2
(45) Date of Patent: Jun. 16, 2026

(54) WHEEL ASSEMBLY FOR A UNITRACTOR AND A UNITRACTOR COMPRISING SAID WHEEL ASSEMBLY

(71) Applicant: Punda AS, Finnøy (NO)

(72) Inventors: Arne Nordbø, Finnøy (NO); Ola Hovda, Talgje (NO); Ragnvald Salte Malmin, Nærbø (NO); Vidar Løtveit, Sandnes (NO); Hogne Fjellanger, Tau (NO); Gabriel Pollestad, Nærbø (NO); Leif-Inge Nødland, Stavanger (NO)

(73) Assignee: Punda AS, Finnøy (NO)

( * ) Notice: Subject to any disclaimer, the term of this patent is extended or adjusted under 35 U.S.C. 154(b) by 410 days.

(21) Appl. No.: 18/272,017

(22) PCT Filed: Dec. 22, 2021

(86) PCT No.: PCT/NO2021/050280
§ 371 (c)(1),
(2) Date: Jul. 12, 2023

(87) PCT Pub. No.: WO2022/173305
PCT Pub. Date: Aug. 18, 2022

(65) Prior Publication Data
US 2024/0067276 A1      Feb. 29, 2024

(30) Foreign Application Priority Data

Feb. 11, 2021     (NO) .................................... 20210173

(51) Int. Cl.
*A01B 51/02*          (2006.01)
*A01B 33/02*          (2006.01)
(Continued)

(52) U.S. Cl.
CPC .......... B62D 51/065 (2013.01); A01B 33/028 (2013.01); A01B 51/02 (2013.01);
(Continued)

(58) Field of Classification Search
CPC ....... A01B 33/028; A01B 51/02; B60B 27/02; B60K 1/04; B60K 2001/045;
(Continued)

(56) References Cited

U.S. PATENT DOCUMENTS 396,023 A      1/1889   Bloom
1,307,327 A    6/1919   Van Nort
(Continued)

FOREIGN PATENT DOCUMENTS

CN        1132586        10/1996
CN        203378234       1/2014
(Continued)

OTHER PUBLICATIONS

Extended European Search Report for EP Publication No. 4291008, dated Nov. 11, 2024.
(Continued)

*Primary Examiner* — Joshua E Rodden
(74) *Attorney, Agent, or Firm* — ANDRUS INTELLECTUAL PROPERTY LAW, LLP

(57)          ABSTRACT

A wheel assembly is for a unitractor. The wheel assembly has a wheel, a static hub and an internal electrical motor. The wheel has a rim, a traction member arranged to the periphery of the rim and a plurality of magnets arranged to the inside of the rim. The hub has a stator having spherical windings. The wheel is rotatably connected to the hub via at least one bearing. At least one side panel extends from the rim and to the at least one bearing. At least one of an energy source and a controller for controlling the energy source is positioned in the hub. The hub is provided with a coupling member for an implement frame. A unitractor having the wheel assembly is also described.

15 Claims, 8 Drawing Sheets

(51) Int. Cl.

| | | |
|---|---|---|
| *B60B 27/02* | (2006.01) | |
| *B60K 1/04* | (2019.01) | |
| *B62D 51/06* | (2006.01) | |

(52) U.S. Cl.

CPC ................ *B60B 27/02* (2013.01); *B60K 1/04* (2013.01); *B60K 2001/045* (2013.01)

(58) Field of Classification Search

CPC ............. B60L 2200/14; B60L 2200/46; B60L 2220/44; B62D 51/065; B62K 1/00; B62M 6/65; H02K 1/187; H02K 1/2786; H02K 1/2791; H02K 21/22; H02K 21/222; H02K 7/1846

USPC ........ 180/15, 19.1, 65.51; 310/75 C, 156.26, 310/265

See application file for complete search history.

(56) References Cited

U.S. PATENT DOCUMENTS

| | | | | |
|---|---|---|---|---|
| 2,535,614 | A | 12/1950 | Ausdall | |
| 4,015,668 | A * | 4/1977 | Wilson | A01B 51/02 172/260 |
| 4,021,690 | A * | 5/1977 | Burton | B60B 3/02 310/67 R |
| 5,343,128 | A * | 8/1994 | Beltrame | B60K 7/0007 318/296 |
| 5,691,584 | A * | 11/1997 | Toida | H02K 7/116 310/67 R |
| 5,894,902 | A * | 4/1999 | Cho | B60L 3/0061 310/67 R |
| 6,278,216 | B1 | 8/2001 | Li | |
| 6,448,674 | B1 * | 9/2002 | Schierling | F16F 15/13157 310/91 |
| 6,470,981 | B1 | 10/2002 | Sueshige et al. | |
| 6,492,756 | B1 | 12/2002 | Maslov et al. | |
| 6,836,035 | B1 * | 12/2004 | Pawletko | H02K 37/06 310/68 B |
| 7,658,251 | B2 * | 2/2010 | James | B60L 50/16 310/67 R |
| 8,766,493 | B2 * | 7/2014 | Hunter | H02K 7/06 310/152 |
| 8,914,175 | B2 * | 12/2014 | Westlake | B60L 50/40 701/22 |
| 9,167,737 | B2 | 10/2015 | Mcgowen | |
| 10,075,050 | B2 * | 9/2018 | Perry | H02K 19/103 |
| 11,479,107 | B2 * | 10/2022 | Payne | H02K 7/14 |
| 11,833,906 | B2 * | 12/2023 | Gomberg | B60K 1/02 |
| 2002/0084119 | A1 | 7/2002 | Brabetz et al. | |
| 2003/0213630 | A1 | 11/2003 | Pyntikov et al. | |
| 2011/0056177 | A1 | 3/2011 | Goto et al. | |
| 2011/0191013 | A1 * | 8/2011 | Leeser | H02K 7/116 180/10 |
| 2012/0083375 | A1 | 4/2012 | Lo | |
| 2012/0161497 | A1 * | 6/2012 | He | B60L 50/30 301/6.5 |
| 2014/0054953 | A1 | 2/2014 | Zanfei et al. | |
| 2014/0318879 | A1 | 10/2014 | Gillett | |
| 2014/0345891 | A1 | 11/2014 | Mcgowen | |
| 2016/0007520 | A1 | 1/2016 | McGowen | |
| 2016/0068055 | A1 | 3/2016 | Wolf-Monheim et al. | |
| 2016/0068056 | A1 | 3/2016 | Burtov et al. | |
| 2016/0075177 | A1 | 3/2016 | Biderman | |
| 2021/0009232 | A1 * | 1/2021 | Liu | B60B 27/047 |
| 2021/0023951 | A1 | 1/2021 | Gomberg | |
| 2022/0204133 | A1 * | 6/2022 | Huang | H01M 50/249 |

FOREIGN PATENT DOCUMENTS

| | | |
|---|---|---|
| CN | 105667590 | 6/2016 |
| DE | 102016218628 | 3/2018 |
| EP | 0463168 | 1/1992 |
| EP | 2848515 | 3/2015 |
| IT | 20090173 | 4/2011 |
| JP | 2002159202 | 6/2002 |
| WO | 2016086057 | 6/2016 |

OTHER PUBLICATIONS

Norwegian Search Report for NO20210173, dated Aug. 3, 2021.
International Search Report and the Written Opinion for PCT/NO2021/050280, dated Apr. 1, 2022.
Response to the Written Opinion for PCT/NO2021/050280, dated Jun. 13, 2022.
Second Written Opinion for PCT/NO2021/050280, dated Sep. 22, 2022.
Response to the Second Written Opinion for PCT/NO2021/050280, dated Oct. 5, 2022.
International Preliminary Report on Patentability for PCT/NO2021/050280, dated Mar. 14, 2023.

\* cited by examiner

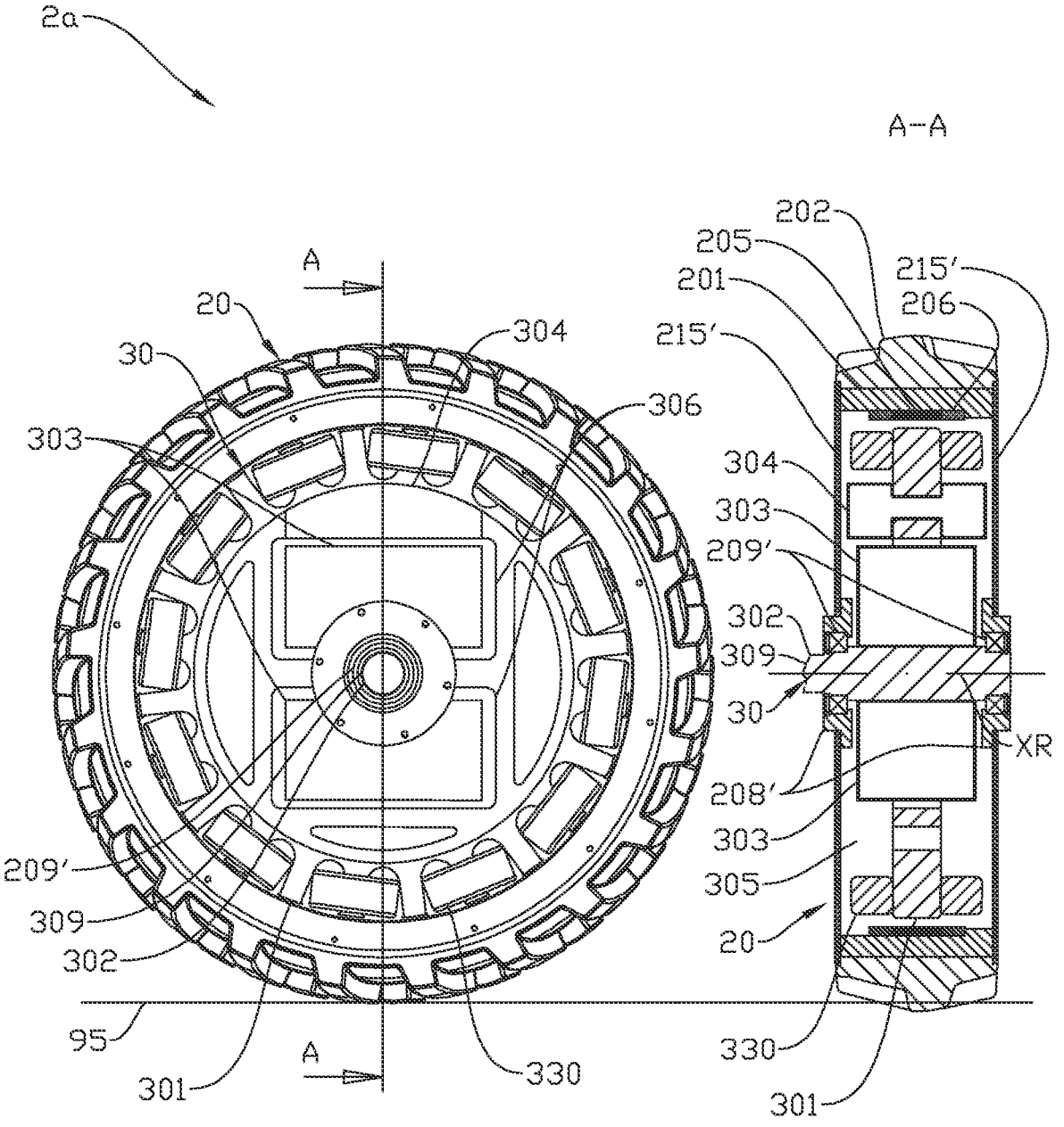
Fig. 1a                    Fig. 1b

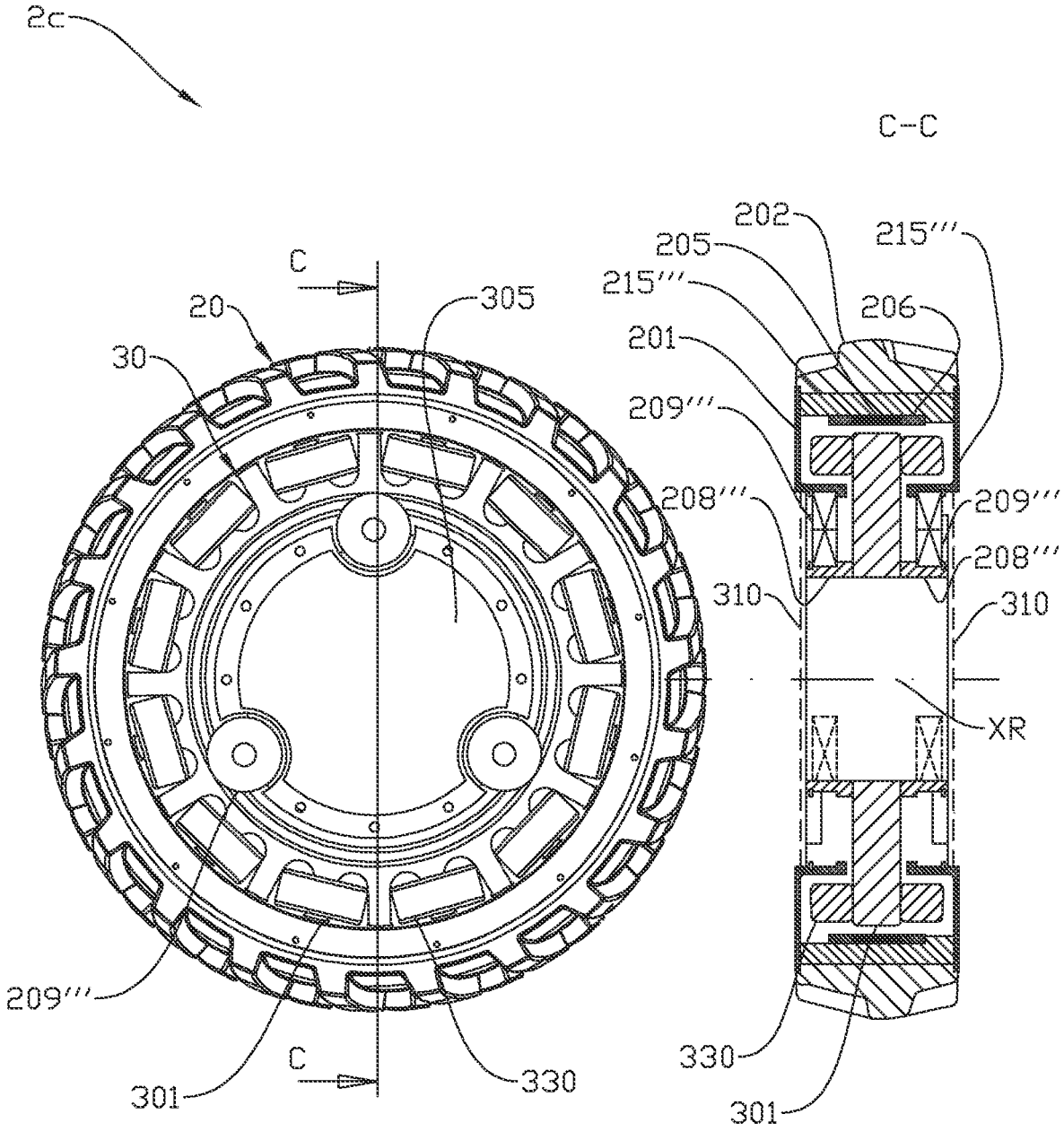
Fig. 3a                    Fig. 3b

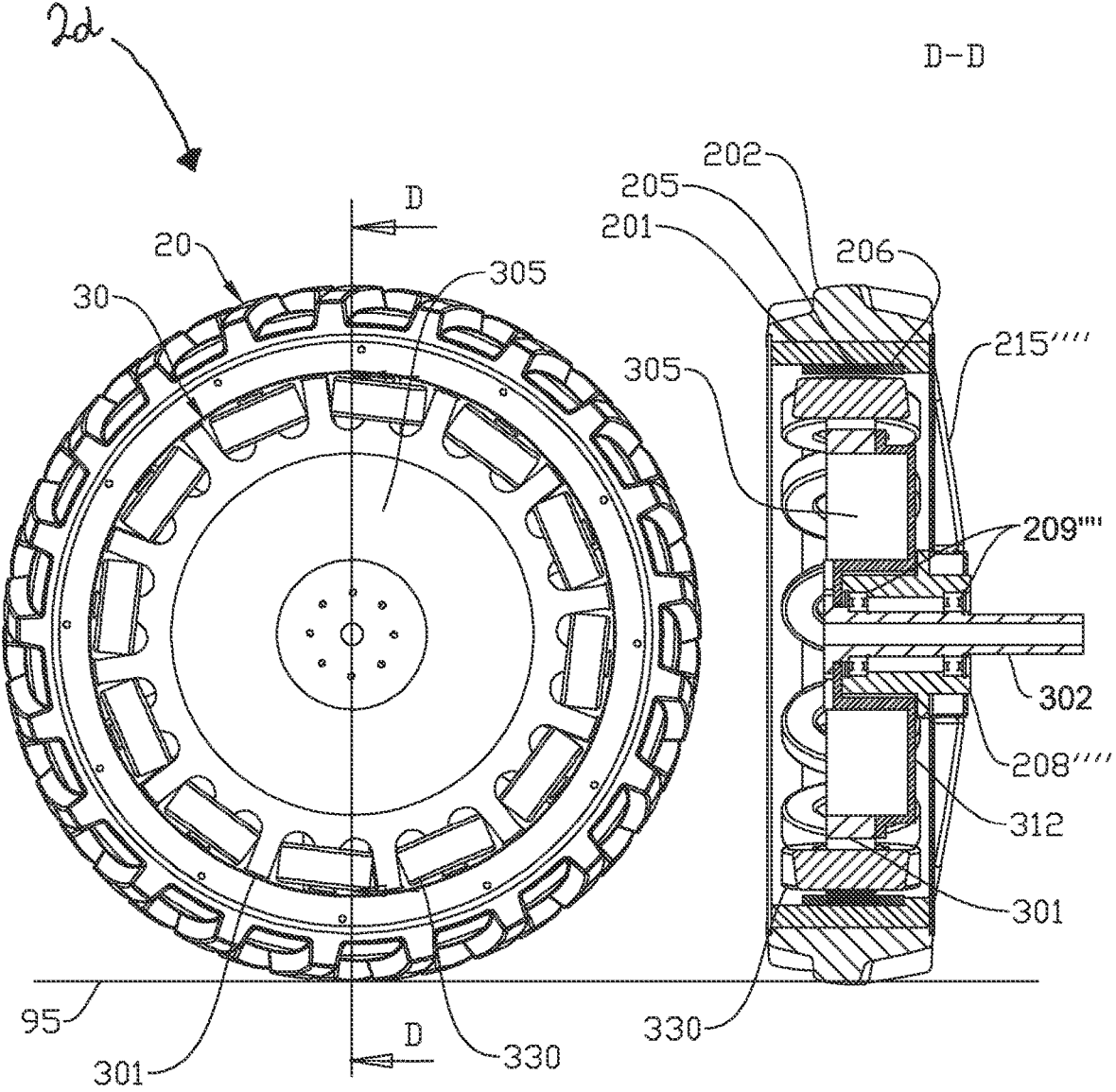
Fig. 4a                    Fig. 4b

1a

2a

20

5

30

2a

5

309

2a

309

5

52

30

20

51

1

WHEEL ASSEMBLY FOR A UNITRACTOR AND A UNITRACTOR COMPRISING SAID WHEEL ASSEMBLY

CROSS-REFERENCE TO RELATED APPLICATIONS

This application is the U.S. national stage application of International Application PCT/NO2021/050280, filed Dec. 22, 2021, which international application was published on Aug. 18, 2022, as International Publication WO 2022/173305 in the English language. The International Application claims priority of Norwegian patent application No. 20210173, filed Feb. 11, 2021. The international application and Norwegian application are both incorporated herein by reference, in entirety.

FIELD OF INVENTION

The present invention relates to a wheel assembly for off road use. More specifically the invention relates to a wheel assembly comprising an electrical drive. The invention also describes a unitractor comprising the wheel assembly.

BACKGROUND OF THE INVENTION

It is known to use small single-wheel tractors also known as mono wheel tractors and unitractors, to pull small implements such as a plough or a harrow. Low weight and small dimensions make the unitractor well suited for small areas, low-bearing soil and in row crops.

Unitractors according to prior art comprises a combustion engine arranged outside and in line with the wheel to keep it as stable as possible. The power is transmitted from the engine to the wheel via a driveline, typically a chain or gears. A unitractor typically comprises handles so that an operator can walk and operate the unitractor from behind. An implement, for instance a plough or a harrow may be connected to the unitractor.

Unitractors were mainly developed after World War I and World War II and have gradually been replaced with larger two-wheel tractors and four-wheel tractors. Today, unitractors are therefore hardly in use anymore.

In developing areas in Africa and Asia, a significant part of the agricultural work is done by manual labor, and often by women. For many farmers, a donkey or a bull is the only extra traction they have available and can afford. The animals are typically used for heavy work as ploughing, pulling logs or a wagon.

A unitractor can be of great help in many rural communities, but unitractors have not been developed in many years, and prior art unitractors are not very suitable. One reason is that fuel is a costly minimum factor that makes a traditional combustion engine unsuitable.

From a health and safety (HSE) point of view it is also unfortunate to walk behind a polluting combustion engine. Strict emission regulations requiring costly and complex exhaust treatment systems are being implemented in more and more countries. Even though these regulations are not yet in force in most developing countries, all people deserve an acceptable working environment.

U.S. Pat. No. 2,535,614 describes a single wheel garden tractor provided with a combustion engine mounted in front of the wheel. The forces are transmitted from the engine to the wheel hub via a gear transmission on the side of the wheel.

US396023 describes a single wheel tractor provided with a combustion engine mounted above the drive wheel. The forces are transmitted from the engine to the hub of the wheel via a chain transmission on the side of the wheel.

Patent publication US 2016/0007520 shows an electrically driven garden implement having a hub motor assembly coupled to a frame.

The invention has for its object to remedy or to reduce at least one of the drawbacks of the prior art, or at least provide a useful alternative to prior art.

The object is achieved through features, which are specified in the description below and in the claims that follow.

SUMMARY OF THE INVENTION

The invention is defined by the independent patent claims. The dependent claims define advantageous embodiments of the invention.

In a first aspect, the invention relates to a wheel assembly for a unitractor, where the wheel assembly comprises a wheel, a static hub and an internal electrical motor comprising a stator and a rotor. The wheel comprises the rotor, a rim and a traction member arranged to the periphery of the rim. The hub comprises the stator. The wheel is rotatable connected to the hub via at least one bearing, where at least one side panel extends from the rim and to the at least one bearing. At least one of an energy source and a controller for controlling the energy source is positioned within the hub, and the hub is provided with a coupling member for an implement frame.

The rotor may comprise a plurality of magnets arranged to the inside of the rim.

The stator may comprise spherical windings.

The energy source and the controller may be positioned within the hub.

By traction member is herein understood a member arranged to create a traction to the ground. The traction member may in one embodiment be an off-road tire with ribs, known as a tractor pattern. The traction member may be arranged to drive a belt. The traction member may in alternative embodiments be formed by metal or composite material.

The rotor and the stator provide an electric motor arranged to create an electromagnetic field for rotating the wheel relative to the hub when an electrical current is applied to the stator. The rotating wheel comprising the rim is thus the rotor.

The magnets and the spherical windings provide a simple and reliable electrical motor.

The control of the electric motor is first and foremost the operator's choice of the desired speed forwards and backwards, as a proportional function of the speed of the engine clockwise and counter-clockwise. The control may be programmed to automatically provide the torque needed to maintain the desired speed set by the operator.

The bearing may be any object arranged to reduce the friction between two rotatable elements. The bearing may be a roller bearing, a ball bearing, a sliding bearing. The bearing may comprise a composite material.

In one embodiment one bearing may positioned along one centre axis. In an alternative embodiment, two bearings may be positioned on one common centre axis, forming a pair of bearings. Said two bearings may be arranged symmetrically about a longitudinal and vertical centre plane for the wheel assembly when the wheel assembly is in an operative position. The wheel and the hub may be connected to each other with one bearing. The wheel and the hub may be connected to each other with multiple bearings.

The side panel may be connected directly to the at least one bearing. The side panel may be connected to the at least one bearing via appropriate means, for instance a collar, an adapter, a bracket or similar. The side panel may comprise a runway for the at least one bearing.

In the following, driving components will be used as a general term for any element used for creating the magnetic field between the spherical windings and magnets and to regulate the magnetic field. The energy source, the controller and a signal receiver are examples of driving components. The wheel assembly may comprise more and other driving components than mentioned above.

When positioning at least one driving component in the hub, the at least one driving component can be protected inside the hub.

In an alternative embodiment, all driving components required to operate and drive the wheel assembly may be positioning inside the hub, giving all components protection.

By "in the hub" is herein understood a compartment which in an axial direction of the wheel assembly is delimited by a panel on each side of the wheel, and in a radial direction is delimited by the spherical windings and/or the stator and/or a collar for the bearing.

By positioning the driving components inside the hub, the wheel assembly may be used as a stand-alone power pack. It also enables the wheel assembly to be shifted from one implement frame to another implement frame without connecting and/or disconnecting cables from an energy source or control unit. The coupling member may also enable an end user to design and build her/his own implement frame for the wheel assembly. This feature gives the invention a unique flexibility.

By implement frame is herein understood any element arranged to connect the wheel assembly with another object, for instance, but not limited to; a frame, a bracket, an implement, a control body and a second wheel assembly and support wheels.

By implement frame is herein understood any element arranged to connect the wheel assembly with an implement, secondary frame or likewise, or directly to any other object as described above. The coupling member may be arranged on one side of the hub. The coupling member may be arranged on two sides of the hub. The coupling member may be an axle. The coupling member may be a flange. The coupling member may be a bracket. The coupling member may be connected to the stator. The coupling member may be integrated in a side cover for the hub.

The energy source may be a battery.

A battery enables the wheel assembly to be used without harmful emissions, and the energy required to operate the wheel assembly can be stored in one or more batteries positioned inside the wheel assembly. The battery may be rechargeable. The battery may be replaceable. The hub may comprise a battery slot for easy replacement of the battery. The battery may be connected to an electrical power inlet for charging the battery. The electric voltage for operating the wheel assembly may be between 2.5V and 1500V. The current may be direct. The current may be alternating.

The controller may comprise components known in the prior art for stepless speed control of an electric motor. The operation of the wheel assembly may be done wirelessly or by wire.

The wheel assembly described herein may be arranged for on-road use and/or off-road use. The wheel assembly may be exposed to any of, but not limited to, dirt, mud, dust, sand, branch, liquid and stones. In this connection, it is an advantage that the driving components are positioned inside the wheel assembly, enabling the wheel assembly to be used in any said conditions without risk of damaging the driving components. The wheel assembly may comply with IP64 or IP67, to ensure sufficient protection from dust and water of the driving components.

The wheel assembly may comprise fuel cells.

The fuel cells may be used to create electrical energy which can be used for charging the battery. An advantage with a fuel cell, is that electrical energy can be produced inside the wheel assembly. The fuel cells may be used to create electrical energy for the electrical motor.

In an alternative embodiment, the battery may be charged by means of inductive charging.

In the following, three possible embodiments for the bearing configurations will be presented.

In one embodiment the at least one bearing may be positioned coaxially with an axis of rotation of the wheel.

This embodiment enables that a smallest possible bearing may be used and connected to a shaft belonging to the hub. In the first embodiment the driving components are positioned on a radial outside of the bearing.

In an alternative embodiment the at least one of the energy source and the controller may be positioned inside the at least one bearing.

A large bearing with a large inner diameter, may form a cavity inside the bearing where the driving components may be positioned closely together on a radial inside of the bearing. When components are positioned closely together, the length of wires may be shortened and components may be connected directly to each other, reducing the risk of contact failure. It also enables multiple components to be preassembled, which may simplify the assembly of the wheel assembly. The second embodiment may be advantageous if the wheel assembly is carrying a large payload.

In another alternative embodiment at least three bearings may be positioned circularly about the axis of rotation and enclosing at least one of the energy source and the controller.

In the third embodiment, a cavity similar to the second embodiment and with the same advantages may be available, but the large bearing is replaced with three smaller bearings, giving a cheaper and lighter wheel assembly compared with the second embodiment. One of the at least three bearings may be adjustable in a radial direction to ensure a tight connection with the side panel.

All bearing configurations above may comprise two bearings side by side on a common axis, or a single bearing only.

At least one of the energy source and controller may be positioned in a cavity in the stator.

In one embodiment, the stator may be formed as the hub. When the stator is formed as the hub frame, the stator may comprise one or more cavities for the driving components.

An effect of positioning at least one of the energy source and controller in the stator as described herein, is that the driving elements may be positioned closely together as described above.

The stator may be a support structure for the hub. This enables a compact design where the stator may be used for supporting the driving components as well as the spherical windings.

The stator may be provided with the coupling member.

An effect of arranging the coupling member to the stator, is that forces transmitted from the coupling member to the wheel assembly can be absorbed by the stator and thereby be distributed around the stator.

The coupling member may be positioned in a centre of the hub.

An effect of positioning the coupling member in a centre of the hub, is that the wheel may be connected to the hub via one bearing or a pair of bearings mounted on the axle. Additionally, an implement frame may revolve about the centre axis of the unitractor and may have a constant distance to the wheel if the implement frame turns.

The coupling member may be positioned off centre of the hub.

An effect of positioning the coupling member out of centre, typically below the centre axis of the wheel, is that the centre of gravity of the implement frame may be lowered. In an alternative embodiment, the coupling member may be adjustable in a vertical and a longitudinal direction of the wheel assembly.

At least a portion of the at least one of the energy source and the electrical control component may be positioned in the centre of the hub.

An effect of positioning driving components in the centre of the hub, is that the components may be positioned closely in one cavity only. When components are positioned closely together, the length of wires may be shortened and components may be connected directly to each other, reducing the risk of contact failure and cable break. It also enables multiple components to be preassembled, which can simplify the assembly of the wheel assembly.

The wheel assembly may comprise a control system for remote operation.

One effect of remote operation is that the speed and direction of the wheel may be operated remotely, for instance by a cell phone or a tablet.

The wheel assembly may comprise a control system for autonomous operation.

An advantage with autonomous operation, is that the wheel assembly may be used in a configuration for autonomous operations, for instance crop care or field monitoring.

The wheel assembly may comprise means for electronical communication between two or more wheel assemblies. This enables the two or more wheel assemblies to run as a pair or a fleet.

The hub may comprise a power outlet.

An effect by said power outlet, is that the wheel assembly may supply an energy absorber with electric energy. The energy absorber may for instance be an implement, a lamp or a cell phone. The implement may for instance be a cutter bar or a power harrow.

The hub may comprise a power inlet.

An effect by said power inlet, is that the battery inside the wheel assembly may be charged by connecting a cable to the power inlet.

The power outlet and the power inlet may be one coupling, so the wheel assembly in a first mode can receive an electric current, and in a second mode can deliver an electric current.

In a second aspect, the invention relates to a unitractor comprising the wheel assembly according to the first aspect of the invention and an implement frame.

By unitractor is herein understood a vehicle comprising a drive wheel provided with a drive unit and an implement frame and/or an implement or likewise.

By implement frame is herein understood any element arranged to connect the wheel assembly with another object, for instance, but not limited to; a frame, a bracket, an implement, a second wheel assembly and support wheels.

By adding the implement frame to the wheel assembly, the wheel assembly may be used to pull, push or carry a load, and execute a work, for instance cultivation, transport, mowing, and road maintenance.

The implement frame may comprise a coupling member for the other object. The coupling member may be a quick coupling.

The implement frame may be height adjustable.

The effect of the height adjustment is that the position of the frame may be optimized to any tools or device connected to the implement frame. The height adjustment may be continuously adjustable.

The implement frame may comprise a coupling member for an agricultural implement.

An effect of said coupling member is that the unitractor may be optimized for agricultural and corresponding operations. The coupling member may be used for connecting the wheel assembly to any kind of implement.

The implement frame may be connected to at least one support wheel.

An effect of the support wheel is that the power pack can be kept stable when operated remotely and/or autonomous. In one embodiment the power pack may comprise one support wheel. The one wheel may be positioned to one side of the unitractor via a wheel arm. Said wheel arm may comprise a coupling member for an implement. The one wheel may be electrically driven, enabling the power pack to go straight or in curves.

In an alternative embodiment the power pack may comprise two support wheels. The two support wheels may be positioned on each side of the unitractor, forming a triangular footprint.

An angle between the wheel assembly and the at least one support wheel may be adjustable.

An effect of the adjustable angle is that the unitractor may turn. The adjustable angle may be provided by a pivoting frame or by at least one pivoting support wheel.

BRIEF DESCRIPTION OF THE DRAWINGS

In the following is described examples of preferred embodiments illustrated in the accompanying drawings, wherein:

FIG. 1a shows in a side view a first embodiment of a wheel assembly;

FIG. 1b shows a cross section view of FIG. 1a;

FIG. 2a shows in a side view a second embodiment of the wheel assembly;

FIG. 2b shows a cross section view of FIG. 2a;

FIG. 3a shows in a side a view third embodiment of the wheel assembly;

FIG. 3b shows a cross section view of FIG. 3a;

FIG. 4a shows a in a side view a fourth embodiment of the wheel assembly;

FIG. 4b shows a cross section view of FIG. 4a;

DETAILED DESCRIPTION OF THE DRAWINGS

Figures 2A, 2B:
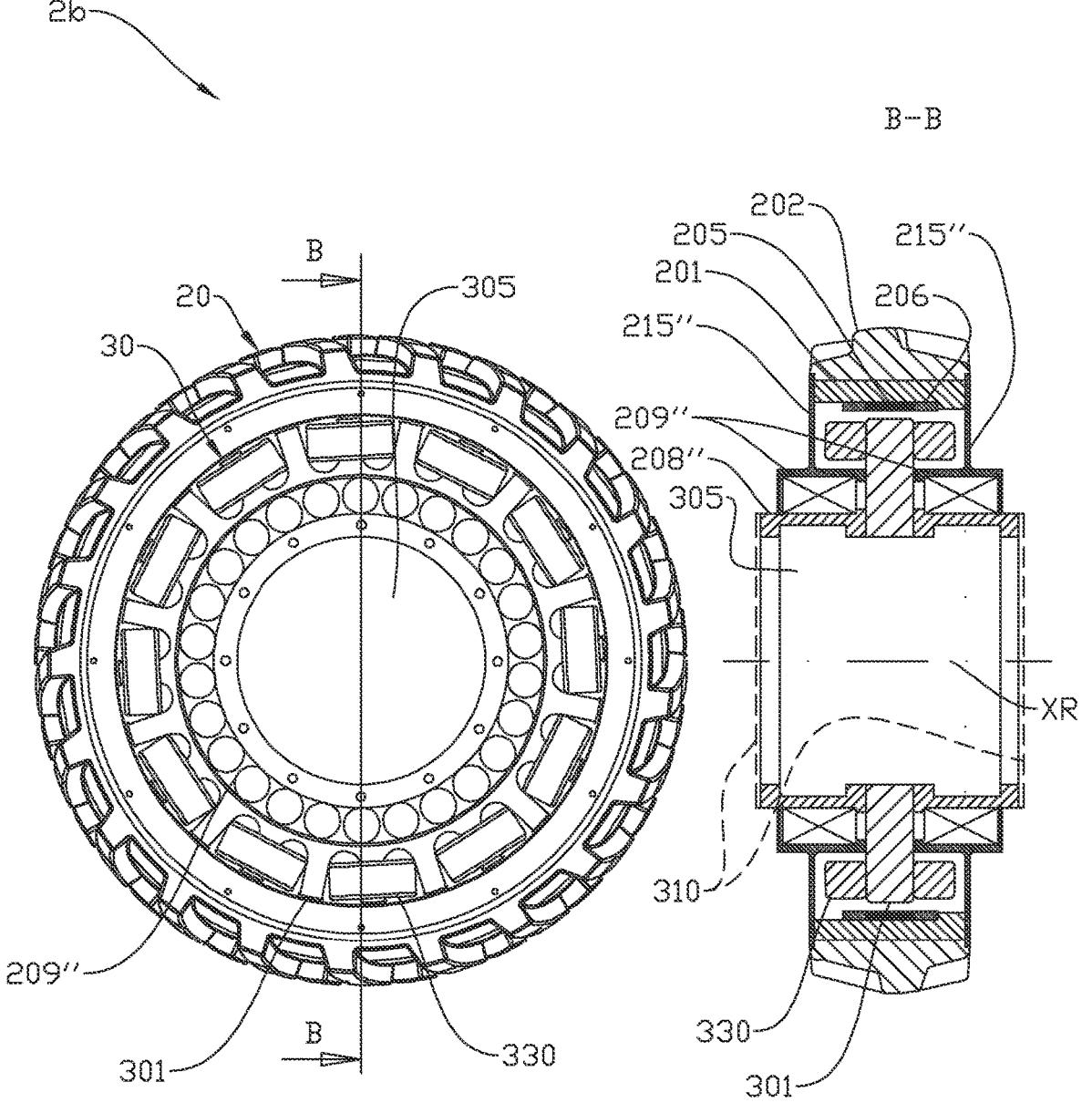

It should be noted that the illustrations are simplified to show the uniqueness of the invention in the best possible way. This is especially true for the cross-section views. It should further be noted that the embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

It should further be noted that elements with the same function, but in different positions and configurations are marked with apostrophes. For instance, are 209', 209", 209''' and 209'''' referring to different embodiment and configurations of a bearing 209.

In cross section views 1b. 2b, 3b, and 4b, parts with a cross hatching going from left up to right lower, are parts of the wheel. Parts with a cross hatching going from right up to left lower, are parts of the hub.

FIGS. 1a and 1b show a first embodiment 2a of a wheel assembly 2 comprising a wheel 20 and a hub 30.

The hub 30 comprises a stator 301 comprising spherical windings 330. The stator 301 further comprises a shaft 302, which a pair of bearings 209' are attached to. The bearings 209' are positioned coaxially with an axis of rotation XR of the wheel 20.

A portion of the shaft 302 is arranged as a coupling member 309. The hub 30 further comprises a cavity 305 which is partly formed by recesses 306 in the stator 301 and an open space between the stator 301 and side panels 215. All driving components required for rotating the wheel 20 around the hub 30 is arranged in the said cavity 305. The volume and the shape of the cavity 305 is among other things dependent on the shape of the stator 301, the windings 330 and how the hub 30 and the wheel 20 are connected.

The first embodiment 2a is shown with two batteries 303 which are positioned in the cavity 305 and two recesses 306 in the stator 30. A controller unit 304 is also shown, the controller unit 304 being formed so it fills out one recess 306 and a portion of the cavity 305 next to the stator 301. More driving components, such as cables, antennas and sensors (not shown) can be fitted in the remaining volume of the cavity 305.

The wheel 20 comprises a rim 201, a traction member 202 arranged to the outside of the rim 201, more specific by the periphery of the rim 201. A plurality of magnets 205 are arranged to the inside of the rim 201. The magnets 205 are shown positioned inside a non-magnetic holder 206. The magnets 205 may be arranged to the rim 201 without the magnetic holder 206.

When an electric current is applied to the windings 330, a magnetic field is created between the windings 330 and the magnets 205, and the wheel assembly 2a acts as an electrical motor, where the wheel 20 rotates around the hub 30.

Figure 6:
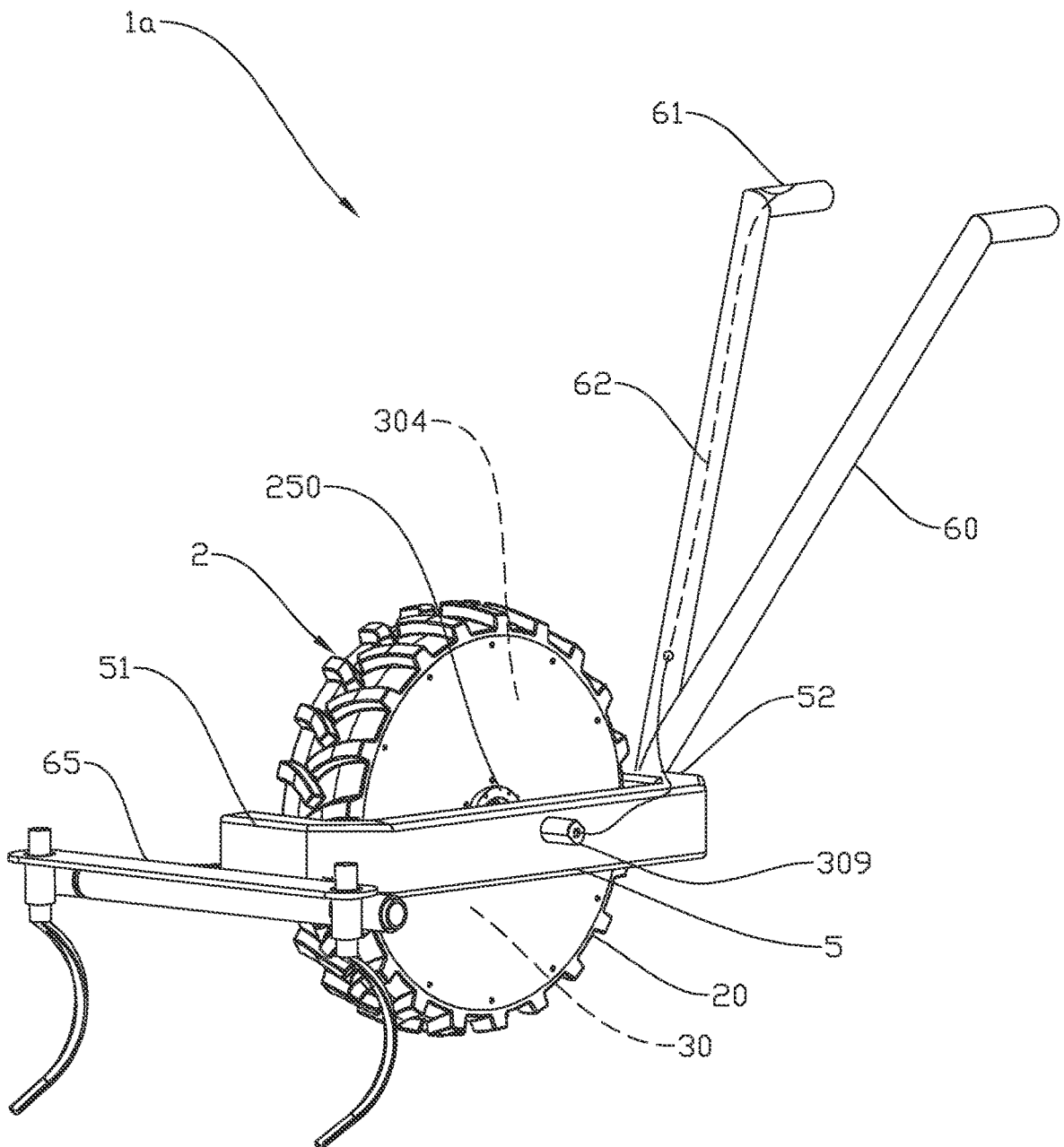
FIG. 6 shows in a perspective view the unitractor in FIGS. 5a-c with an implement.
Figures 7, 8:
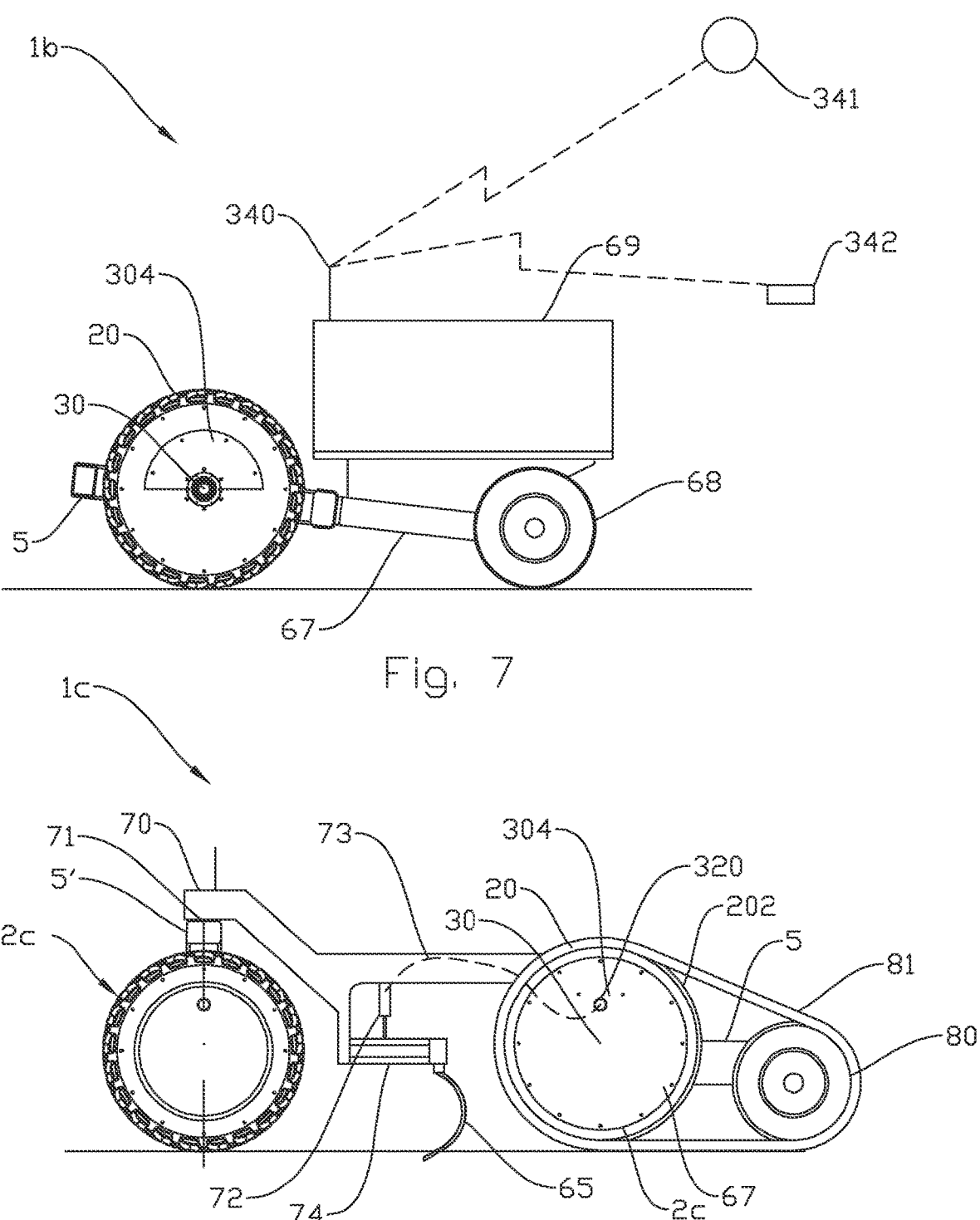
FIG. 7 shows in a side view and a smaller scale a second embodiment of the unitractor.
FIG. 8 shows in a side view a smaller scale a third embodiment of the unitractor.

When the hub 30 is kept in a static position, for instance by a person holding a handle 60 as shown in FIG. 6 or by a load shown in FIGS. 6 and 7, the wheel assembly 2a will move along a ground 95 in a longitudinal direction of the wheel assembly 2a.

The hub 30 may comprise suitable means and sensors (not shown) for registering a relative angle between the hub 30 and the ground 95. This information may be processed by the controller 304, in order to adjust the electric current to avoid that the hub 30 rotates if the wheel 20 becomes stuck in the ground.

FIGS. 2a and 2b shows a second embodiment 2b of the wheel assembly 2. In the second embodiment 2b, the stator 301 has an open centre and comprises a pair of bearings 209" with a large inner diameter enabling driving components to be positioned inside the bearings 209". This design form (FIGS. 2a, 2c) has one large cavity 305 where all driving components, including the battery 303 (not shown) and the controller 304 (not shown) can be positioned. The side panels 215" connecting the wheel 20 and the hub 30 via the bearings 209" are "T-shaped" and comprise a runway for the bearings 209".

A pair of collars 208" are connected to the stator 301 and supports the inner side of the bearings 209". The cavity 305 is closed in an axial direction (sideways) with two hub panels 310 (indicated by dashed line in the drawing) connected to the hub 30.

As the hub panels 310 are connected to the hub 30, and therefore in a static position during operation, the coupling member 309 (not shown) may be connected to at least one of the hub panels 310. The coupling member 309 may for instance be a bracket, bolts, an axle. The coupling member 309 may also be connected to at least one of the collars 208".

FIGS. 3a and 3b show a third embodiment 2c of the wheel assembly 2. The third embodiment 2c comprises a hub 30 with three pairs of bearings 209''' arranged on each side of the stator 301 and with an evenly internal distance. At least one of the pairs of bearings 209''' may be adjustable in a radial direction (not shown) to ensure that the bearings 209''' can be correctly positioned to the side panels 201'''.

Common to all embodiments 2a, 2b, 2c, is that each bearing 209', 209", 209''' is secured in an axial direction. The securement may be a collar 208', 208", 208''' or a locking ring as illustrated.

FIGS. 4a and 4b show a fourth embodiment 2d of the wheel assembly 2, where the bearings 209'''' are positioned out of centre in a longitudinal direction of the wheel assembly 2d. The bearings 209'''' are mounted to a shaft 302, like in the first embodiment 2a.

The fourth embodiment 2d comprises one side panel 215'''' only for connecting the wheel 20 and the hub 30. The side panel 215'''' comprises radial reinforcements so side panel 215'''' can absorb all forces between the wheel 20 and the hub 30. A stator rim 312 is connected to the shaft 302 via a stator rim 312.

Figures 5A, 5B, 5C:
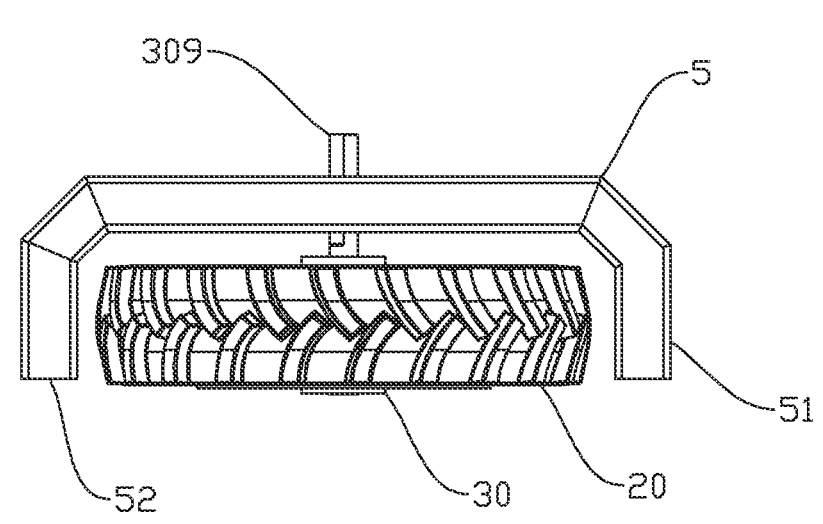
FIG. 5a shows in a side view and a smaller scale a first embodiment of a unitractor.
FIG. 5b shows the unitractor in FIG. 5a in a rear view.
FIG. 5c shows the unitractor in FIG. 5a in a top view.

FIGS. 5a, 5b and 5c show a first embodiment of a unitractor 1a, where an implement frame 5 is arranged to the wheel assembly 2, illustrated with the first embodiment 2a. The frame 5 is shown in a horizontal position. Said implement frame 5 is connected to the wheel assembly 2 via the coupling member 309 connected to the hub 30. The implement frame 5 comprises a first end portion 51 and a second end portion 52.

The unitractor 1a illustrated in the FIGS. 5a, 5b and 5c may be drivable, provided that it has sufficient sideways stability. A control system for the unitractor 1a may be programmed to keep the hub 30 and the implement frame 5 in the illustrated horizontal position shown in FIG. 5a by adjusting the magnetic field, based on inputs from sensors monitoring a longitudinal angle and position of the implement frame, relatively to the wheel 20 and a horizontal plane.

FIG. 6 shows the unitractor 1*a* in FIGS. 5*a*, 5*b* and 5*c* being connected with an implement 65, shown as a cultivator. A handle 60 is also connected to the second end portion 52 of the implement frame 5, so a person can operate the unitractor 1*a*. The handle 60 comprises a speed controller 61 for adjusting the speed and the direction of the unitractor 1*a*. The signals from the speed controller 61 to the controller 304 in the hub 30 are transmitted via a cable 62. The cable 62 is shown partially inside the handle 60 and is connected to the controller 304 in the hub 30 via the coupling member 309.

FIG. 7 shows a second embodiment of a unitractor 1*b*, where the unitractor 1*b* comprises a support wheel arrangement 67 and a box 69. The support wheel arrangement 67 comprises two wheels 68 to keep the unitractor 1*b* stable in a longitudinal direction and a transverse direction. The support wheels 68 are steerable so the unitractor 1*b* can turn. The wheel arrangement 67 can comprise a secondary battery (not shown) connected with the battery 303 in the hub 30, for increasing the operational time.

The unitractor 1*b* can comprise GPS receiver and antenna 340 for being connected to a satellite 341 for autonomous operation. In an alternative embodiment, an autonomous unitractor 1*b* may operate in a swarm with other unitractors 1*b*.

The unitractor 1*b* can also be connected to a smartphone or tablet 342 for remote controlling of the unitractor 1*b* via an app. The app may be used for programming and controlling the unitractor 1*b*.

FIG. 8 shows a third embodiment of a unitractor 1*c*, comprising three wheel assemblies 2*c*, where two of the three wheel assemblies 2*c* comprise a belt 81 and a belt wheel 80. The traction member 202 is customized to drive the belt 81. An implement frame 5 connects the wheel assembly 2*c* and the belt wheel 80.

An alternative embodiment 5' of the implement frame 5 is illustrated, where the implement frame 5' is shown in a vertically position and connected to a secondary frame 70 via a pivot 71. The pivot 71 enables the first wheel assembly 2*c* to rotate around a vertical centre axis of the first wheel assembly 2*c*.

An implement 65 is connected to the secondary frame 70 via a parallelogram 74. The height of the implement 65 is adjusted by an electric actuator 72 connected to the frame 70 and the parallelogram 74. The actuator 72 is powered from the battery 303 in the hub 30 via a cable 73 connected to a power outlet 320 in the hub panel 310 being part of the hub 30. Since the hub 30 is static, the power outlet 320 will not rotate.

Figure 9:
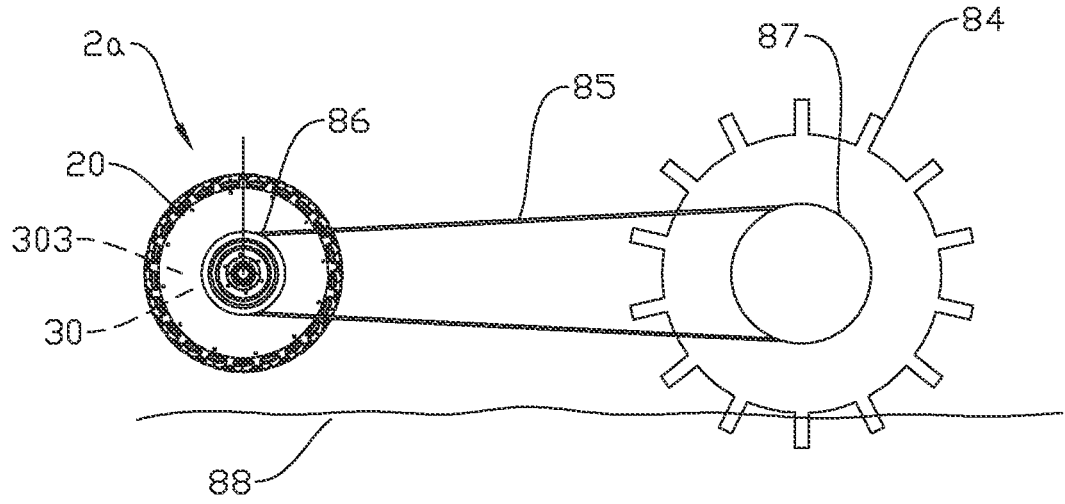
FIG. 9 shows in a side view a fourth embodiment of the unitractor.
Figure 10:
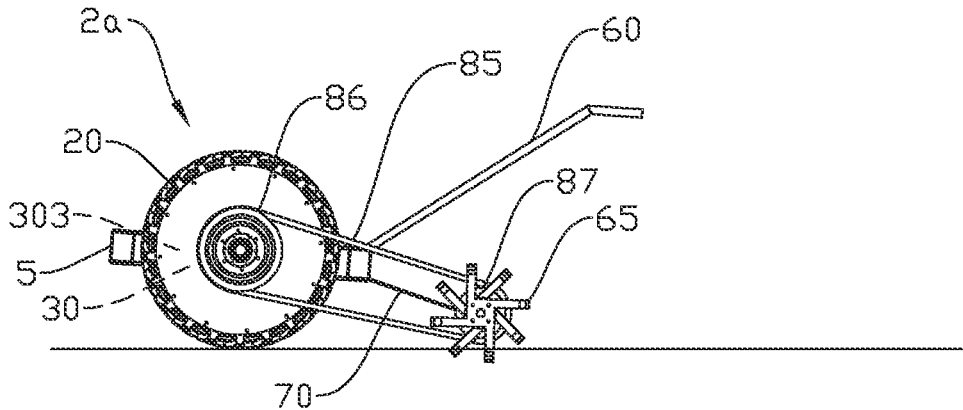
FIG. 10 shows in a side view a fifth embodiment of the unitractor.

FIGS. 9 and 10 show how the wheel assembly 2 can receive and provide mechanical energy.

In FIG. 9 the wheel assembly 2*a* receives mechanical energy from an impeller 84 positioned in a water flow 88. The wheel assembly 2*a* is connected to the impeller 84 via a belt 85 running on a first pulley 86 arranged to the wheel 20, and a second pulley 87 arranged to the impeller 84. When the water 88 flows, the impeller 84 rotates and the belt 85 transfers the rotation to the wheel 20 which rotates around the hub 30, and an electric current is provided between the rotor and the stator inside the wheel assembly 2*a*. The electric current provided in the wheel assembly 2*a* can be used to charge the battery 303 or for powering an electric consumer (not shown). In a not shown embodiment, the impeller 84 may be replaced by a windmill or similar.

In FIG. 10 the wheel assembly 2*a* provides mechanical energy to an implement 65, shown as a mechanical power harrow. As in FIG. 9, the wheel assembly 2*a* comprises a first pulley 86 arranged to the wheel 20. The power harrow 65 is connected to the wheel assembly 2*a* via an implement frame 5 and a secondary frame 70. The power harrow 65 comprises a second pulley 87, having a smaller diameter than the first pulley 86. The first pulley 86 and the second pulley 87 is connected via a belt 85. When the wheel 20 rotates, the belt 85 transfers the rotation to the power harrow 65.

As described and illustrated, the wheel assembly 2 may be operated as a power pack providing an electrical power inlet, and/or and electrical power outlet, and/or a mechanical power inlet and/or a mechanical power outlet. The wheel assembly 2 may thereby provide maximal flexibility with regard to energy transfer.

The invention claimed is:

1. A wheel assembly for a unitractor where the wheel assembly comprises a wheel, a hub and an internal electrical motor comprising a stator and a rotor, wherein:
   the wheel comprises the rotor, a rim, and a traction member arranged to a periphery of the rim,
   the hub comprises the stator, and
   the wheel is rotatably connected to the hub via at least one bearing, where at least one side panel extends from the rim and to the at least one bearing to protect at least one component of the hub,
   wherein
   at least one of an energy source and a controller for controlling the energy source is positioned in a cavity in the stator, and
   the hub is provided with a coupling member for an implement frame.

2. The wheel assembly according to claim 1, where the rotor comprises a plurality of magnets arranged to an inside of the rim.

3. The wheel assembly according to claim 1, where the energy source and the controller are positioned in the hub.

4. The wheel assembly according to claim 1, wherein the energy source is a battery.

5. The wheel assembly according to claim 1, wherein the energy source comprises a fuel cell.

6. The wheel assembly according to claim 1, where the at least one bearing is positioned coaxially with an axis of rotation (XR) of the wheel.

7. The wheel assembly according to claim 3, where at least one of the energy source and the controller is positioned inside the at least one bearing.

8. The wheel assembly according to claim 1, wherein the coupling member is positioned in a center of the hub.

9. The wheel assembly according to claim 1, wherein at least a portion of the at least one of the energy source and the controller is positioned in a center of the hub.

10. The wheel assembly according to claim 1, wherein the wheel assembly comprises a control system for remote operation.

11. The wheel assembly according to claim 1, wherein the wheel assembly comprises a control system for autonomous operation.

12. The wheel assembly according to claim 1, wherein the hub comprises a power outlet.

13. A unitractor comprising the wheel assembly according to claim 1 and an implement frame.

14. The unitractor according to claim 13, wherein the implement frame comprises a coupling member for an agricultural implement.

15. The unitractor according to claim 13, where the implement frame is connected to at least one support wheel.

\* \* \* \* \*